(12) United States Patent
Arnold et al.

(10) Patent No.: US 8,051,968 B2
(45) Date of Patent: Nov. 8, 2011

(54) CLUTCH UNIT INCLUDING A WET CLUTCH

(75) Inventors: Johannes Arnold, Achern (DE); Ivo Agner, Bühl (DE); Oliver Nöhl, Bühlertal (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 374 days.

(21) Appl. No.: 12/231,985

(22) Filed: Sep. 7, 2008

(65) Prior Publication Data

US 2009/0114498 A1    May 7, 2009

(30) Foreign Application Priority Data

Mar. 7, 2006 (DE) .......................... 10 2006 010 799
Feb. 15, 2007 (DE) ................ PCT/DE2007/000295

(51) Int. Cl.
*F16D 13/72*    (2006.01)

(52) U.S. Cl. .......... 192/70.12; 192/113.31; 192/113.36; 188/264 D; 188/264 CC

(58) Field of Classification Search .............. 192/113.3, 192/113.31

See application file for complete search history.

(56) References Cited

U.S. PATENT DOCUMENTS

| | | | |
|---|---|---|---|
| 3,638,773 A * | 2/1972 | Lewis et al. ................. | 192/18 A |
| 4,693,350 A | 9/1987 | Sommer ..................... | 192/18 A |
| 5,788,037 A * | 8/1998 | Forsyth et al. .............. | 192/70.12 |
| 6,059,682 A | 5/2000 | Friedmann et al. .......... | 475/159 |
| 7,287,634 B2 | 10/2007 | Agner et al. ................ | 192/87.11 |
| 2004/0074728 A1 | 4/2004 | Sasse ......................... | 192/3.21 |
| 2006/0207855 A1 | 9/2006 | Arnold et al. ............... | 192/70.12 |

FOREIGN PATENT DOCUMENTS

| | | |
|---|---|---|
| DE | 718 161 | 3/1942 |
| DE | 727 545 | 11/1942 |
| DE | 754 096 | 2/1953 |
| DE | 198 00 490 A1 | 8/1998 |
| DE | 101 09 497 A1 | 8/2002 |
| DE | 10 2004 016 061 A1 | 10/2004 |
| DE | 10 2004 029 145 A1 | 1/2005 |
| DE | 10 2004 061 020 A1 | 7/2005 |
| EP | 1 703 159 A1 | 9/2006 |
| WO | WO 2007/012312 A1 | 2/2007 |

* cited by examiner

*Primary Examiner* — David D Le
*Assistant Examiner* — Jacob S Scott
(74) *Attorney, Agent, or Firm* — Alfred J. Mangels

(57) ABSTRACT

A clutch unit for use in the drive train of a motor vehicle between a drive unit and a transmission including at least one transmission input shaft. The clutch unit includes at least one wet clutch device that is provided with a plurality of clutch elements, in particular clutch discs, that are at least partially wetted by a coolant such as oil. The coolant carries away frictional heat that is generated by slippage between adjacent clutch discs during certain vehicle operating conditions. The heat absorbed by the clutch coolant is cooled by heat transfer from the coolant to a cooler that surrounds the clutch unit.

11 Claims, 18 Drawing Sheets

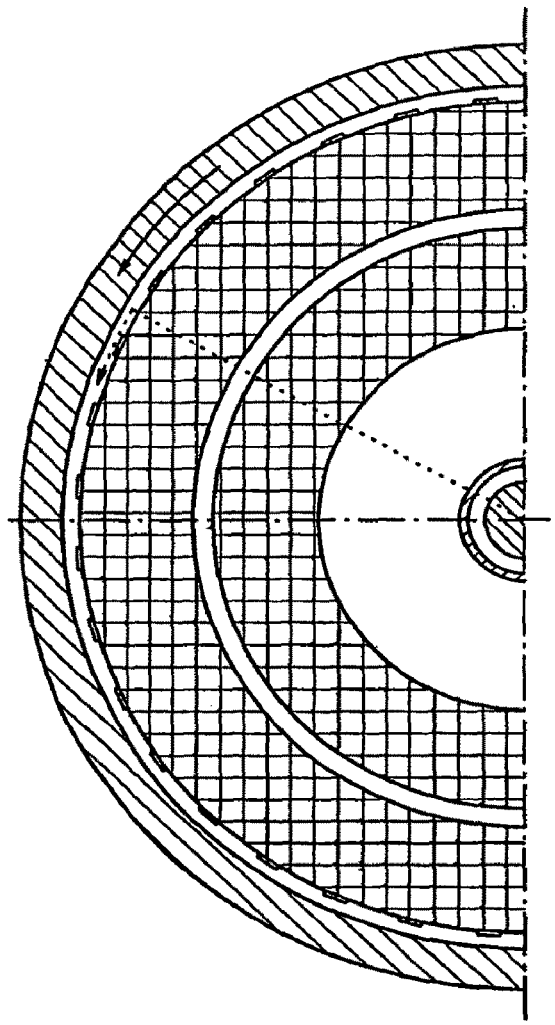
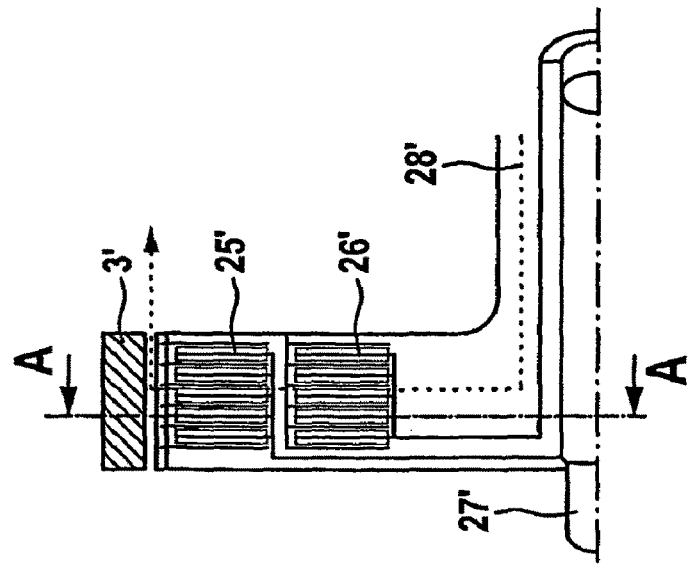

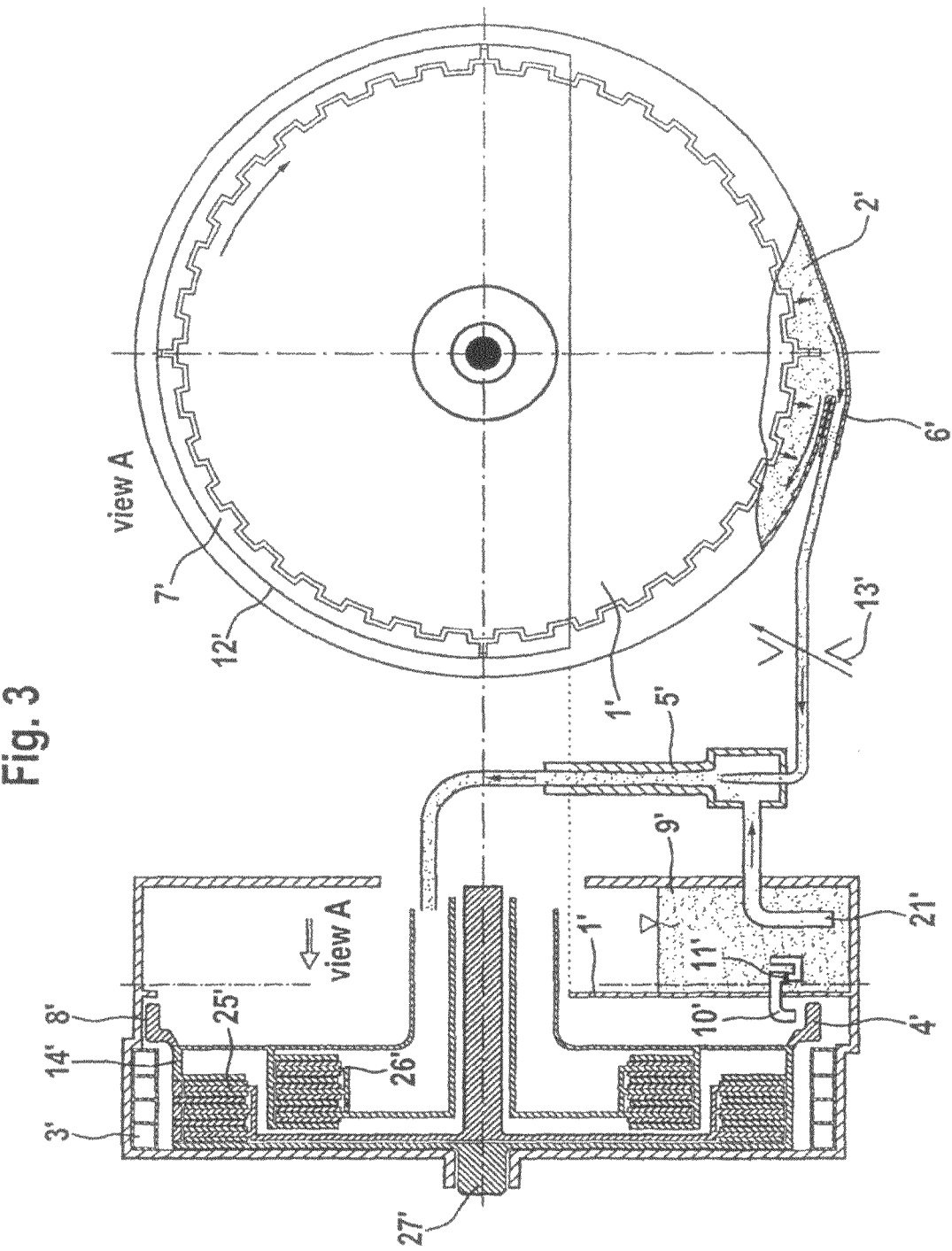

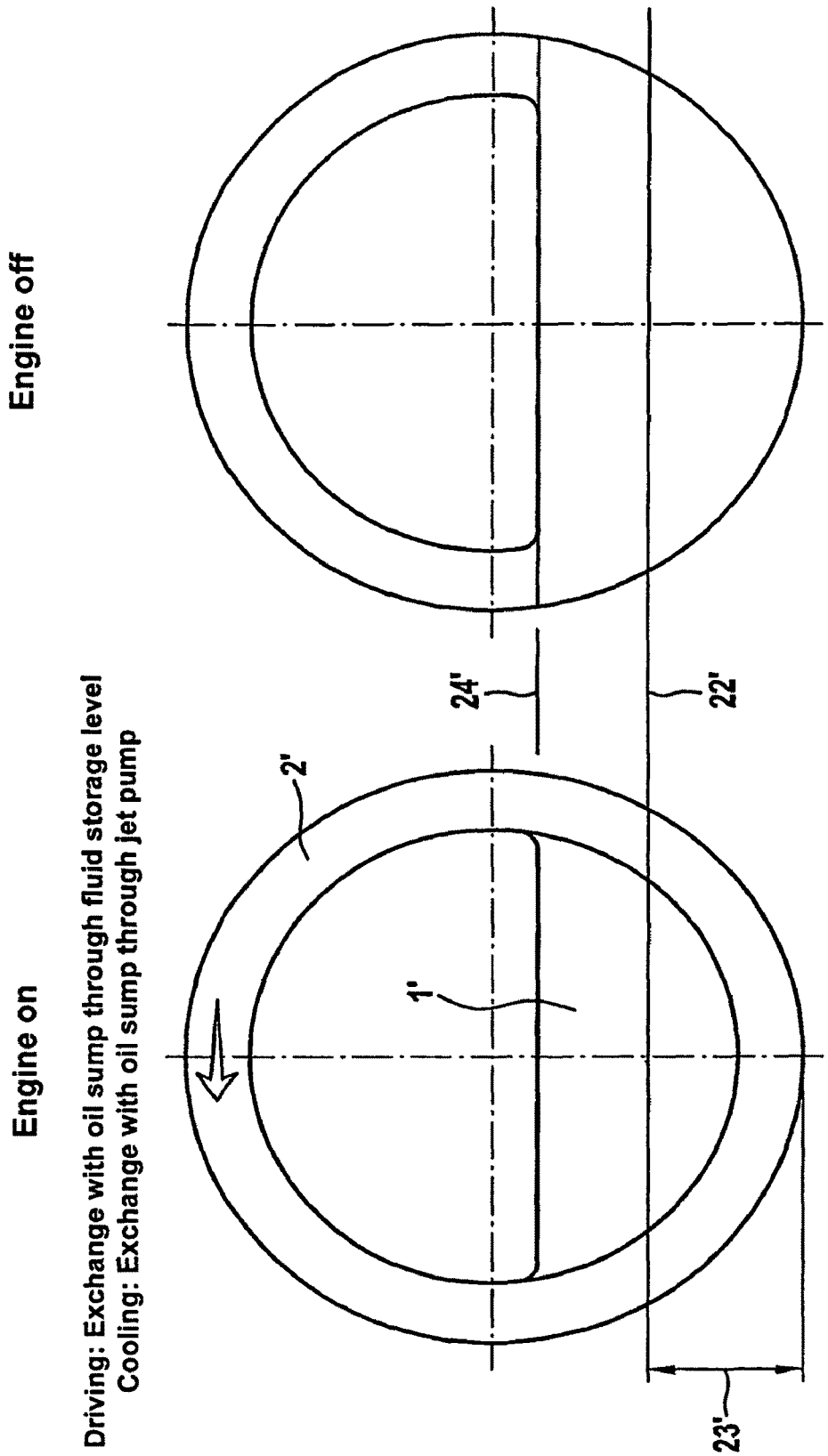

View A-A

View B-B

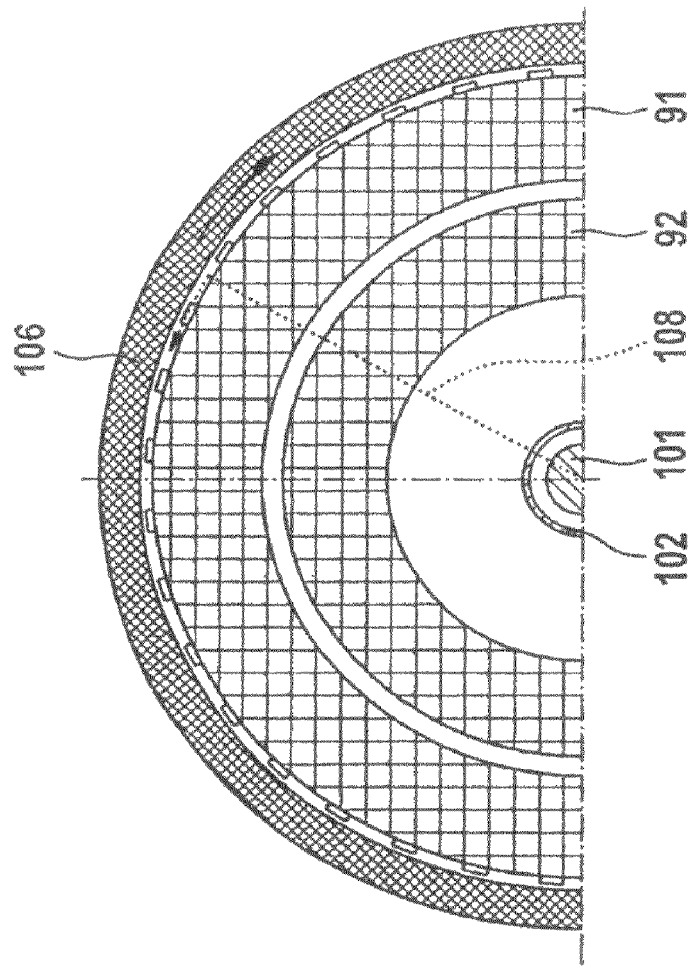
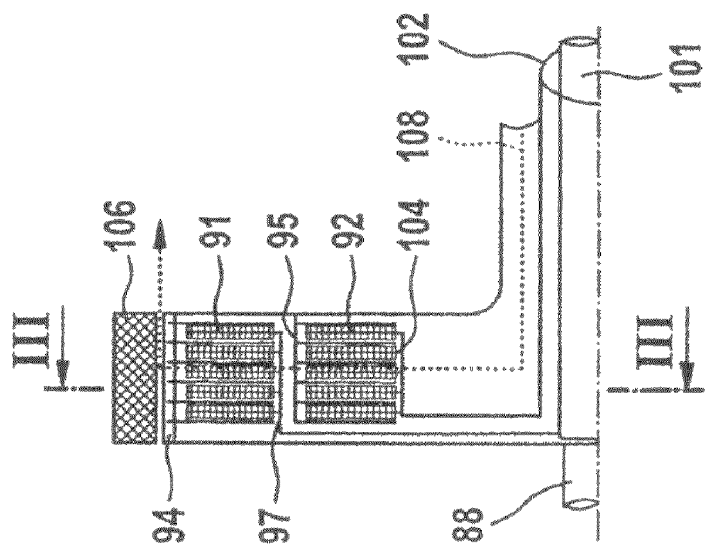

CLUTCH UNIT INCLUDING A WET CLUTCH

CROSS-REFERENCE TO RELATED APPLICATION

This application is a continuation of International Application Serial No. PCT/DE2007/000295, having an international filing date of Feb. 15, 2007, and designating the United States, the entire contents of which is hereby incorporated by reference to the same extent as if fully rewritten.

BACKGROUND OF THE INVENTION

1. Field of the Invention

The present invention relates to a clutch unit that includes at least one wet clutch that is cooled by a cooling fluid like, e.g., oil, that flows over the friction surfaces. The present invention particularly relates to a clutch unit that includes at least one multidisc clutch having input discs and output discs that are disposed behind one another in an axial direction, wherein a coolant flows between the discs at least when the multidisc clutch is open. The present invention furthermore relates to a clutch unit that includes at least two clutches, in particular multidisc clutches.

2. Description of the Related Art

Multidisc clutch units are disclosed in German published patent application Nos. DE 10 2004 061 020 A1, DE 10 2004 029 145 A1, and DE 10 2004 016 061 A1.

In such clutch units, typically the heat generated through friction at the discs has to be removed by a coolant. For that purpose, the clutches are cooled by oil in most applications. The oil has to be introduced into the clutches and has to be pumped out from the clutches again after the cooling process, in order to be cooled itself, in turn, in a cooler. Thereafter, it can be fed back into the coolant loop.

The quantity of cooling oil supplied to the clutches can be controlled according to the driving condition of the vehicle. While driving, a minimum coolant volume flow can be provided, in order to remove the heat generated by the slippage control of at least one of the clutches. During clutch operation, a large volume flow can be provided, since a rather large amount of heat is thus generated. During synchronization, the volume flow of cooling oil can be reduced to zero, in order to avoid a residual drag moment at the clutch discs. The largest volume flow is required during so-called stall. Thus, the entire engine power is dissipated by the clutch as heat.

Systems that use a separate oil cooler are state of the art. The hot oil is pumped out of the clutch and run into an oil container, or into the transmission sump. From there, the oil is pumped out by a separate pump and fed back to the clutch through an oil cooler.

It is an object of the present invention to provide a cooling device, which facilitates improved cooling of wet clutches. The clutch device in accordance with the present invention should furthermore only require little installation space, and it should preferably be possible to integrate it into the clutch unit. Furthermore, the clutch device in accordance with the present invention should have high efficiency and should be producible in a cost effective manner.

SUMMARY OF THE INVENTION

In accordance with one aspect of the present invention, the heat generated through the slippage of the friction discs of a wet clutch is removed by a coolant fluid that is in a coolant loop, and that is fed back to the clutch over and over again for heat removal. Within the coolant loop the liquid is cooled in order to again remove heat when it is run through the clutch the next time. The liquid is cooled by contacting a radially outward fluid cooled surface after leaving the friction discs, and by being run along that surface. The surface required for cooling is disposed in the radial direction around the outer clutch. That arrangement is shown in FIGS. 1 and 2.

FIGS. 1 and 2 illustrate the basic principle of an oil cooling system including an annular cooler 3' that is integrated into the bell-shaped clutch housing. The functional principle and the configuration of the annular cooler will be described below in more detail.

FIG. 3 shows the cooling oil flow path in the illustrated double clutch.

The cooling oil is supplied close to the center of the clutch. Subsequently, it flows through the cooling oil grooves of the discs of the inner and of the outer clutch. The oil rotating with the clutch, which has heated up in both clutches, exits from the disc carrier of the outer clutch due to centrifugal force and impacts the wall of the cooler.

After the clutch disc cooling process, the oil arrives at a rotary feed gap 8' within which the oil is kept in rotation by blades 4' that are disposed on the disc carrier 14'. Through the kinetic energy of the oil, and due to the centrifugal force pressure due to the rotation, the oil is guided out of the clutch housing by an oil outlet guide mechanism 6'. The oil outlet guide mechanism is preferably provided in the lower portion of the clutch housing or of the clutch bell. Subsequently, the oil preferably flows through a jet pump 5', which only operates under correspondingly high volume flows. By virtue of the jet pump, the cooling system is capable of increasing the volume flow very quickly when large volume flows of cooling oil are required. As already described, the oil exiting from the jet pump is supplied to the clutch in the center. Furthermore, the cooling system includes an overflow opening 7', which prevents the clutch from filling up with oil and which can be used for oil exchange with the transmission, if so desired.

Through the system illustrated in FIG. 3, the following driving conditions of a motor vehicle can be implemented:

Driving:

The outlet guide mechanism 6' or a regulating element 13' is adjusted so that a small volume flow is diverted from the rotating ring of oil 2'. At that small volume flow, the jet pump 5' does not operate. Thus, no oil is withdrawn from the storage cavity and/or transmission sump. The oil conveyed by the outlet guide mechanism 6' flows back into the clutch. There, the heat is absorbed, which is generated by the slipping discs when the clutch is at least partially disengaged. Thereafter, the oil impacts the fluid cooled surface of the cooler 3', which surrounds the clutches, and subsequently returns into the rotary feed gap 8'. Through the oil exchange pipe 10', a preferably constant small volume flow can flow from the transmission sump 9' into the rotary feed gap 8'. The volume flow equilibrium within the clutch, which is upset by that small volume flow, is balanced again by the overflow edge 12'. The oil that does not exit from the clutch through the outlet guide mechanism, runs over the overflow edge 12' back directly into the transmission sump.

Shifting/Cooling:

The outlet guide mechanism 6', or a regulating element 13', is adjusted so that a volume flow that is as large as possible is drawn from the rotating ring of oil 2'. At that large oil volume flow, the jet pump operates and increases the volume flow accordingly. The entire volume flow is supplied to the clutch. In the clutch, that volume flow absorbs the heat generated by friction during the shifting process, uphill creep, or stall. Subsequently, the oil is cooled at the fluid cooled surface of the cooler 3' and returns into the rotary feed gap 8' again. The oil exchange pipe 10' feeds a small volume flow from the transmission sump 9' into the rotary feed gap 8'. The total volume flow balance is upset by the oil exchange pipe 10' and by the jet pump 5'. The difference in volume flow between oil withdrawn from the rotary feed gap 8' and the oil that is supplied to the clutch and to the rotary feed gap, is balanced by the overflow edge 12'.

Synchronizing

During synchronizing, no oil must flow through the discs of the clutch, since oil that is disposed in the clutch transmits moments through the slippage to the transmission input shaft, which are undesirable during synchronizing.

The outlet guide mechanism 6', or an adjustment element 13', is adjusted so that no oil is drawn from the rotating oil ring 2'. No oil is supplied to the clutch. The oil exchange pipe 10' operates the same way as in the shifting and driving conditions. The oil supplied by the oil exchange pipe does not flow through the clutch. Therefore, that oil does not create any drag moments at the respective transmission input shaft. The oil volume flow coming from the oil exchange pipe 10' flows over the overflow edge 12' back into the transmission sump 9'.

System Initialization

When the engine is stopped, the oil in the oil ring 2' collects in the lower portion of the clutch or of the clutch housing. When the engine starts, the blades 4' paddle through the oil and make it rotate. At a certain speed of rotation, the oil ring is fully configured, and the oil cycle can be started by opening the outlet guide mechanism 6' or the regulating element 13'.

System with Heat Sink

Depending upon the cooling power of the annular oil cooler, a suitable heat sink has to be used in order to intermediately store the amount of heat that was generated during stall. That arrangement serves to provide that the system also remains in thermal equilibrium under conditions that release large amounts of heat (e.g. stall). Either the transmission sump or a separate oil tank for the clutch can be used as an active heat sink. The transmission housing and the clutch bell form an additional passive heat sink.

System without Heat Sink

When the amount of heat generated during stall can be directly cooled off by the oil cooler, no heat sink is required. Here, it must be assured that the cooler has the same capacity as the capacity dissipated into heat during stall.

The cooled oil that is removed from the clutch by the oil outlet guide mechanism 6' can be directly fed back to the clutch. The entire available oil volume includes the oil volume in the conduits, in the clutch, and in the rotary feed gap 8'.

Embodiments of the Particular Components

Rotary Feed Gap

In order to use the kinetic energy of the oil for feeding it, the oil must be kept in rotation by the rotating feed blades 4'. Thus, mechanical energy is imparted to the oil in order to be able to compensate for the friction losses at the wall of the gap, which oppose the direction of movement.

The rotary feed gap 8' is bounded by the wall of the cooler, or by the clutch housing, and by the partition plate 1'. The overflow edge 12' limits the height of the rotary feed gap, and thus the maximum height of the rotating oil ring.

Rotating Feed Blades

It is the object of the rotating feed blades 4' to keep in rotation the oil that is found in the rotary feed gap 8'. Thus, the blades compensate for the velocity loss resulting from friction between the wall and the oil. Several rotating feed blades can be used; however, at least one blade has to be used.

The rotating feed blades are disposed at the outer disc carrier 14'. They can either be bolted to the disc carrier, welded, or soldered. Furthermore, the blades can be directly integrated into the disc carrier.

The shape of the blades can either be straight across the direction of movement, concave, or convex. Additionally, the blade can be twisted in order to achieve an axial feed component.

The blades can be made of metal and also of plastic.

Partition Plate

The partition plate 1', which is visible in FIGS. 3 and 4, has the object to separate from the clutches the storage cavity and/or the transmission sump 9' having a fluid storage level 23'. When the engine is running, the height of upper edge 24' of the partition plate prevents oil from the transmission sump 9' to flow into the clutches, since due to the rotating oil ring 2', the oil level in the clutch is below the oil level 22' in the transmission sump. When the engine is turned off, the oil level in the clutch rises above the oil level in the transmission sump. In that state, the partition plate prevents oil from the clutch to flow into the transmission sump, since the oil in the clutch is required for the initialization process when the engine is started again.

The overflow opening and the oil exchange mechanism are integrated into the partition plate.

Oil Exchange Mechanism

The oil exchange pipe 10' shown in FIGS. 3 and 5 uses the elevation difference of the rotating oil ring 2' relative to the oil level 22' in the transmission sump 9' to facilitate a constant oil flow from the transmission sump into the clutch. The oil exchange mechanism operates according to the principle of communicating pipes.

When the vehicle is disposed in horizontal position, enough oil is available in order to form an oil ring when the engine is started. When the vehicle stands on an incline, there is the risk that oil within in the clutch flows into the transmission sump 9' through the oil exchange pipe 10'. As a consequence, the oil remaining in the clutch is not sufficient to form an oil ring 2' by means of the kinetic energy of which the oil cycle is put in motion. For that reason, the oil exchange mechanism is provided with a check valve 11', which avoids a backflow of oil from the clutch into the transmission sump 9'. Check valve 11' can be a flap, a ball check valve, or a similar mechanism.

The oil exchange components can be made of plastic and also of metallic materials.

Overflow Opening

As can be seen in FIG. 6, overflow opening 7' is above the upper portion of the partition plate 1'. The overflow opening can either be configured as a slotted hole whose overflow edge extends at a predetermined radius, or it can be provided as several bore holes with the same diameter disposed next to one another, or it can be configured as an approximate semi-circular opening.

The overflow edge 12' of the slotted opening determines the maximum filling level of the rotary feed gap 8'. When the oil level reaches the overflow edge 12', superfluous oil flows through the opening and flows into the oil reservoir (separate clutch oil tank or transmission sump). The size of the overflow opening is determined by the maximum volume flow difference between the volume flow supplied to the clutch and the volume flow from the outlet guide mechanism.

The overflow opening 7' shown in FIG. 6 prevents a filling up of the rotary feed gap 8', which would cause the clutch to fill with oil and would cause the discs of the outer clutch 25' to run in an oil bath. This would cause splashing losses, and when the clutch is open, it would cause an undesired torque transmission. Additionally, the overflow opening 7' contributes to the oil exchange between the clutch and the transmission sump/clutch oil tank, which is necessary to avoid a partially excessive oil attrition.

Outlet Guide Mechanism

It is the object of the outlet guide mechanism 6' to divert oil from the rotating oil ring and to use its kinetic energy to create an oil loop and to operate the subsequently connected jet pump 5'.

In the conduit downstream of the jet pump 5', it is necessary that the fluid that runs in the conduits only partially fills them, since the friction losses in filled tubular conduits creates a pressure drop. The pressure within the conduits must not exceed the ambient atmospheric pressure. In order to avoid that, an opening is made in the conduit at a suitable location in order to allow air to be sucked in.

The oil can be fed out of the rotary feed gap 8' in radial and in axial directions. The following variants can be realized:

Outlet Guide in the Radial Direction According to FIG. 7

Here the oil is fed out of the rotary feed gap 8' in the radial direction. The branch-off from oil outlet guide mechanism 6' is performed in a tangential direction relative to the rotating flow direction. A volume flow regulating element 13' connects to the branch-off, by which the volume flow in the branch-off can be adjusted.

Outlet Guide in the Axial Direction According to FIGS. 8 and 9

During outfeed in the axial direction, a flap 15', which pivots about a rotation axis 16', is submerged in the rotating oil ring. When the flow engages the flap, oil is diverted through the flap 15' having an approximately U-shaped recess. Flap 15' has a curvature in the direction of the outfeed pipe 17', and thus diverts and branches the fed fluid off into the outfeed pipe 17' and supplies it to the downstream jet pump 5'.

When the drive means for the rotation axis is located on the outside, it extends through a bore in the housing and is sealed with a seal element. An O-ring 18' or other seal elements can be used as a seal element.

In an embodiment with an outfeed in the axial direction, shown in FIGS. 10 and 11, a slide 20' is provided, which is movably supported in the axial direction. The slide has an approximately U-shaped recess, which has a curvature in the direction of the outfeed pipe, and thus redirects the fed fluid and supplies it to the outfeed pipe 17'. The slide is moved by a regulating element through the slide linkage 19' into the respective required position.

Options to Actuate the Oil Outlet Guide Mechanisms

Flap Electromagnetically Actuated

The outfeed flap 15', the slide 20', and the volume flow regulating element 13' can be driven by a solenoid. The volume flow regulating element 13' and the slide 20' can be moved directly by the plunger of a solenoid. The outfeed flap 15' can be connected for rotation about rotation axis 16' by an additional lever in order to facilitate its rotation.

Oil Outlet Guide Mechanism Actuated by an Electric Motor

The outfeed flap 15', the slide 20', and the volume flow regulating element 131 can be driven by an electric motor (with or without a transmission). The outfeed flap 15' can be directly driven by the shaft of the electric motor or by the output shaft of a transmission. The slide 20' and the volume flow regulating element 13' can be moved by a lever mounted to the motor- or transmission shaft and a connecting rod, in order to produce linear movement. The slide 20' and the volume flow regulating element 13' can also be driven by an electric motor with a linear unit.

Flap Actuated by a Shape Memory Alloy

It is conceivable to move the outfeed flap 15' and/or the slide 20' and/or the volume flow regulating element 13' by a shape memory wire, which becomes, e.g., shorter or longer when heated. When hot oil exits from the clutch, the wire becomes shorter and moves the respective outfeed mechanism into the position in which more oil is fed, and thus more oil is fed to the clutch. When colder oil exits from the clutch again, the wire becomes longer again, which causes a reset of the outfeed mechanisms. For resetting the outfeed mechanisms, they have to be provided with a respective reset spring.

The described actuation variant is a system that controls itself.

Flap Actuated by Bi-Metal

It is also possible to drive the outfeed flap 15' and/or the slide 20' and/or the volume flow regulating element 13' by a bimetallic mechanism. The control principle is identical with the one including a shape memory wire. The reset spring for the regulation elements, however, would not be used in that application.

BRIEF DESCRIPTION OF THE DRAWINGS

In the following description of the figures, among others, embodiments for the cooler 3', schematically illustrated in the FIGS. 1 to 3 are described in more detail. In conjunction with the figure description further advantages, features, and details of a torque transfer device configured in accordance with the present invention or of a clutch unit configured in accordance with the present invention are described in more detail.

The figures show the following:

FIGS. 1 and 2 show a basic oil cooling arrangement for a double clutch;

FIG. 3 shows a coolant loop for the double clutch shown in FIGS. 1 and 2;

FIG. 4 shows partition plate conditions with an engine off and on;

FIG. 13 is a simplified schematic illustration of a torque transmitting device with a cooler in a semi sectional view;

FIG. 14 is a view taken along the line III-III of FIG. 13;

DESCRIPTION OF THE PREFERRED EMBODIMENTS

Figure 5:
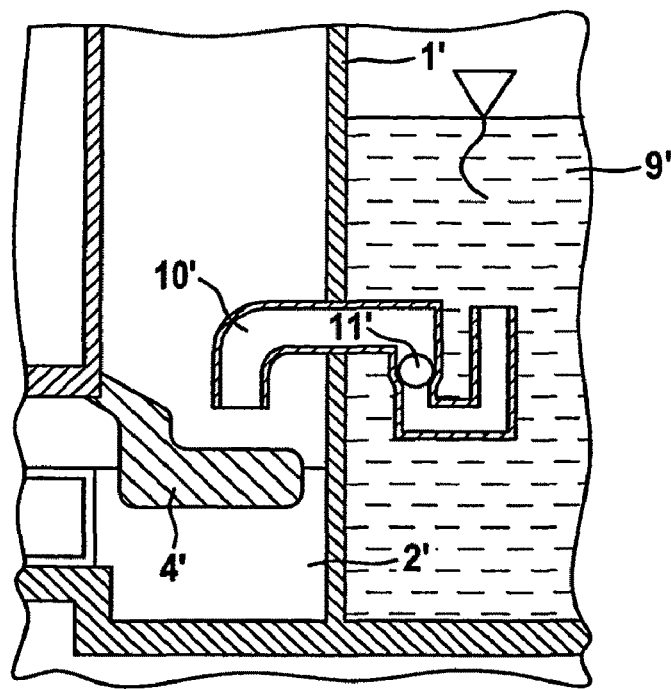
FIG. 5 is an enlarged view of the oil exchange mechanism.
Figure 6:
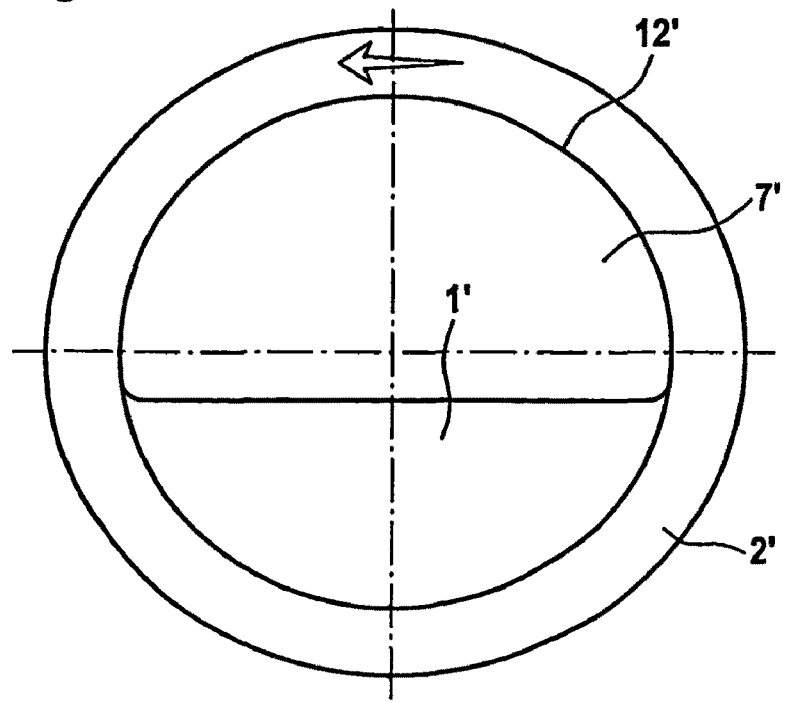
FIG. 6 shows the partition plate and overflow opening.
Figure 7:
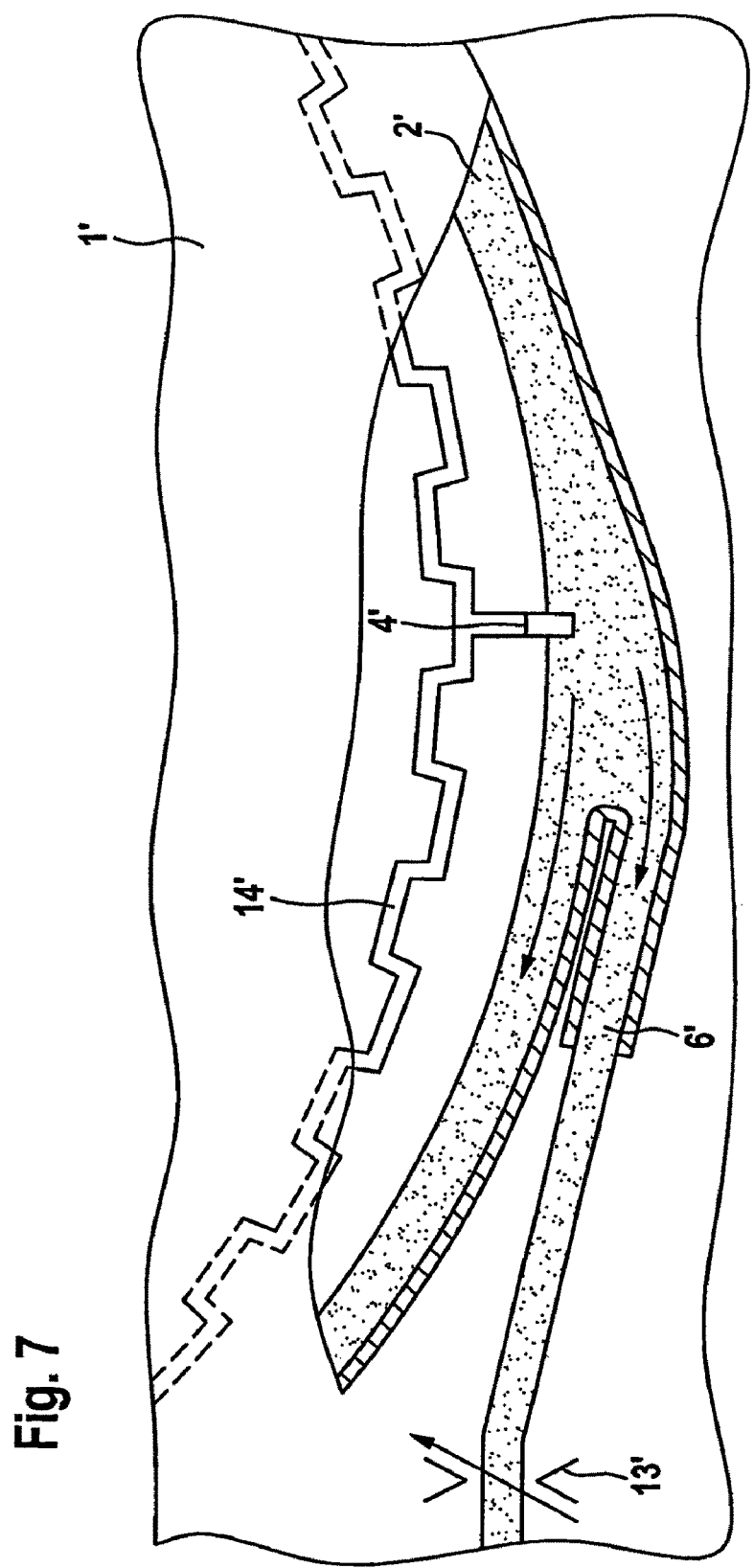
FIG. 7 is an enlarged, fragmentary view of the radial outfeed arrangement.
Figure 8:
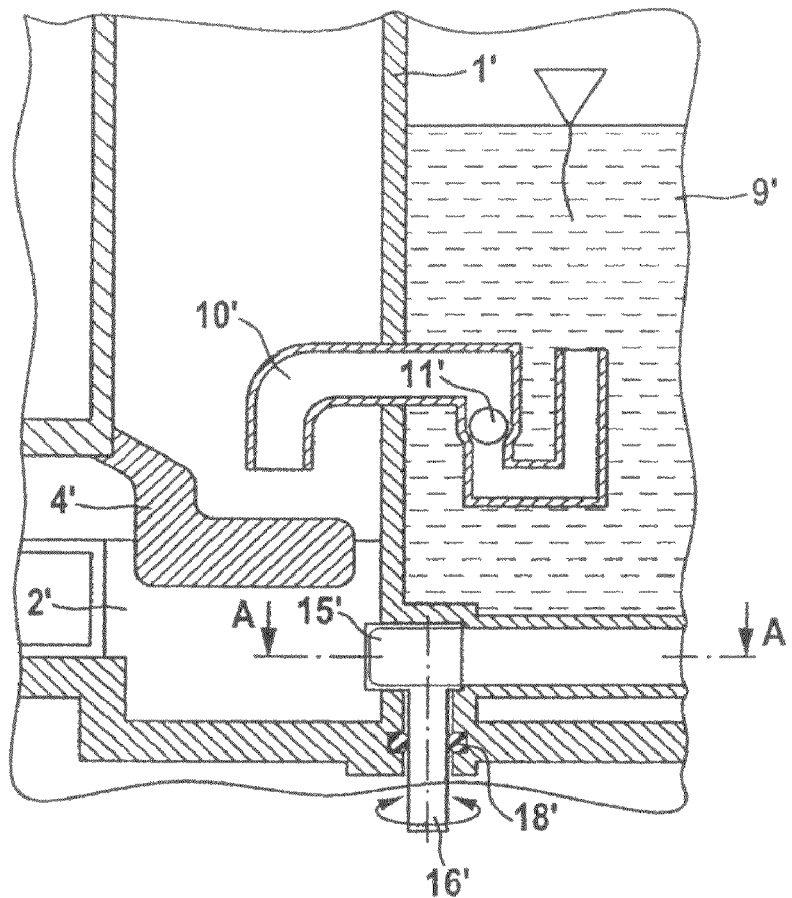
FIG. 8 is an enlarged, fragmentary view of the axial outfeed arrangement with a flow control flap.
Figure 9:
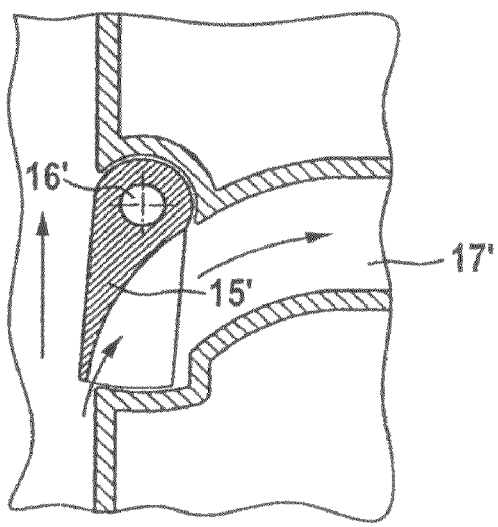
FIG. 9 is a view taken along the line A-A of FIG. 8.
Figure 10:
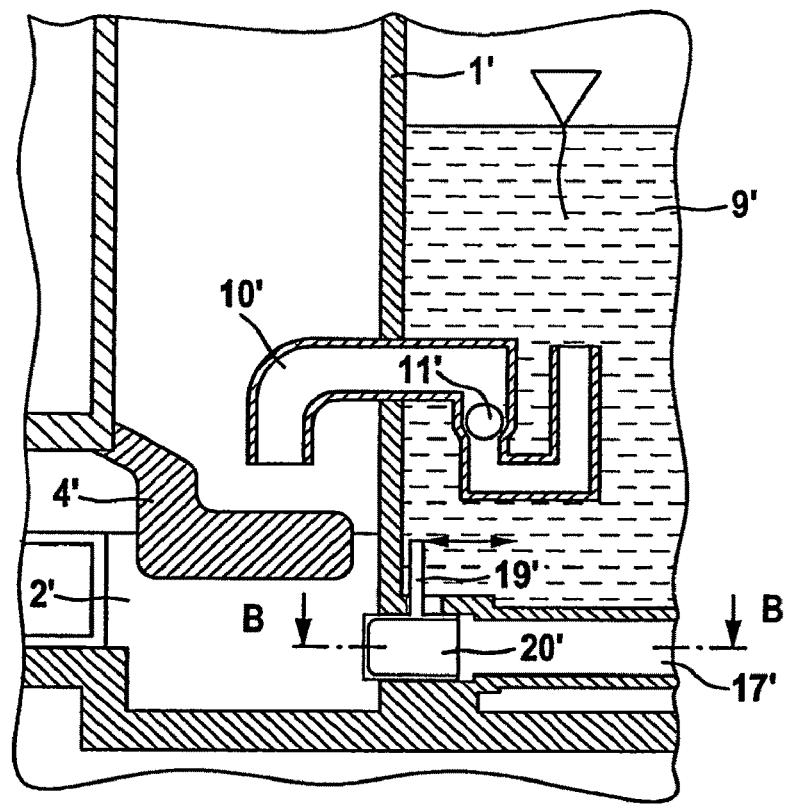
FIG. 10 is an enlarged, fragmentary view of the axial outfeed arrangement with a slide for flow control.
Figure 11:
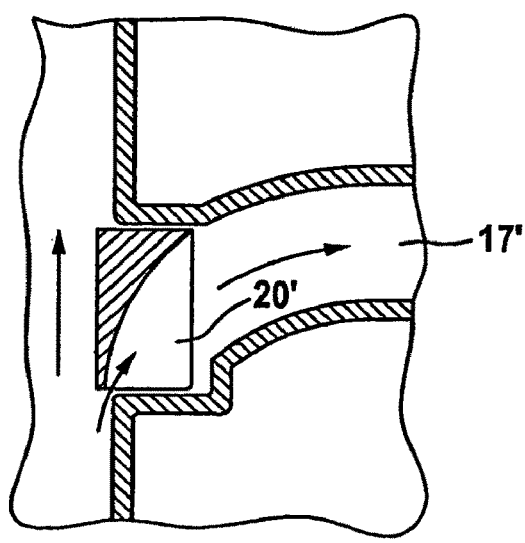
FIG. 11 is a view taken along the line B-B of FIG. 10.
Figure 12:
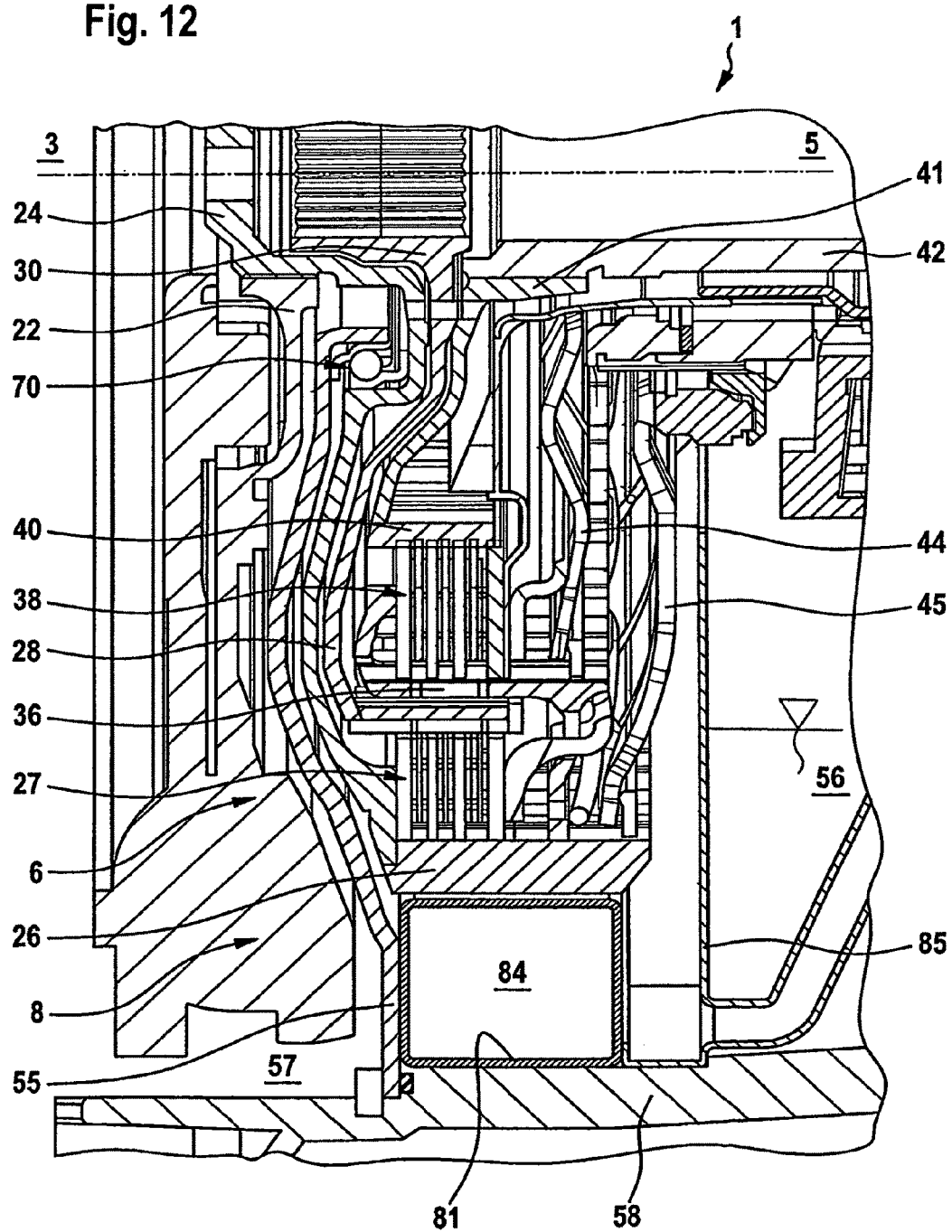
FIG. 12 is a fragmentary cross-sectional view of a first embodiment of a torque transmitting device.

FIG. 12 shows a fragmentary cross-sectional view of a portion of a torque transmitting device 1 that is included as part of a drive train of a motor vehicle. A wet double clutch 6 in multidisc construction is disposed between a drive unit 3, in particular an internal combustion engine from which a crankshaft extends, and a transmission 5. Between the drive unit 3 and the double clutch 6, a vibration damper 8 is connected, which is only indicated by its reference numeral in FIG. 12. The vibration damper 8 is preferably a dual mass flywheel.

The crankshaft of the internal combustion engine 3 is connected, e.g. through threaded connections, with an input component of the vibration damper 8. The input component of the vibration damper 8 is coupled by energy storage elements in a known manner to an output component of the vibration damper. The output component of the vibration damper 8 is non-rotatably connected through a hub component 22 with an input component 24 of the double clutch 6. The clutch input component 24 is integrally connected with an outer disc carrier 26 of a first multidisc clutch assembly 27. Radially within the outer disc carrier 26, an inner disc carrier 28 of the first multidisc clutch assembly 27 is disposed. The inner disc carrier 28 is mounted at the radial inner portion of a hub component 30, which is non-rotatably connected to a first transmission input shaft.

The clutch input component 24, or the outer disc carrier 26, of the first multidisc clutch assembly 27 is non-rotatably connected through a coupling component to an outer disc carrier 36 of a second multidisc clutch assembly 38. Radially within the outer disc carrier 36, an inner disc carrier 40 of the second multidisc assembly 38 is disposed, which is connected to the radially inner portion of a hub component 41. The hub component 41 is non-rotatably connected through a spline connection with a second transmission input shaft 42, which is configured as a hollow shaft. The first transmission input shaft is rotatably disposed within the second transmission input shaft 42.

The two multidisc clutch assemblies 27 and 38 are actuated by respective actuation levers 45 and 44, whose radial inner ends are supported at actuation supports. Between the vibration damper 8 and the outer disc carrier 26 of the first multidisc clutch assembly 27, a clutch cover 55 is disposed, which is mounted to a radially outer portion of a transmission housing section 58. The clutch cover 55 separates a wet cavity 56, in which the two multidisc clutch assemblies 27 and 38 are disposed, from a dry receiver cavity 57, in which the vibration damper 8 is received. Radially inwardly between the clutch cover 55 and the clutch input component 24, a bearing means 70 is disposed.

During the operation of the twin clutch 6, heat is generated through friction at the discs. In order to remove the heat, cooling oil is supplied to the clutch 6, wherein the cooling oil is cooled in a cooling loop. The cooling oil volume supplied to the clutch has to be controlled according to the driving condition of the vehicle. While driving, a minimum cooling volume flow is required, in order to remove the heat generated by the slippage control of the clutch. During clutch operation, a large volume flow has to be supplied, since a rather large amount of heat is generated. During synchronization, the cooling volume flow has to be reduced to zero, in order to avoid a residual drag moment at the clutch discs. The largest volume flow is required at rotational speeds that could cause stalling of the engine. During a stall, the drive unit rotates and the driven unit is stopped. The entire engine power is dissipated through the clutch in the form of heat.

Radially outwardly of the outer disc carrier 26 of the first multidisc clutch assembly 27, an annular chamber 81 is provided that is used for receiving a cooler 84. The annular chamber 81 is bounded radially outwardly by the transmission housing section 58. In the axial direction, the annular chamber 81 is bounded on the drive side by the clutch cover 55. Towards the transmission side, the annular chamber 81 is bounded by a wall 85 of wet cavity 56.

In FIGS. 13 and 14, the basic principle of a torque transmitting device with a cooling system in accordance with the present invention is illustrated in a schematically simplified manner in different views. A crankshaft 88 of an internal combustion engine can be coupled by a first multidisc clutch 91 or by a second multidisc clutch 92 to a first transmission input shaft 101 or to a second transmission input shaft 102. The multidisc clutch assemblies 91, 92 include outer multidisc carriers 94, 95 and inner multidisc carriers 97, 104, respectively. An annular cooler 106 is disposed radially outwardly of the multidisc clutches 91, 92. The flow direction of the cooling oil is indicated by a dotted arrow 108 in FIG. 14.

The cooling oil is cooled by contacting the radial inner wall of the annular cooler 106, and by being guided along that wall immediately after leaving the cooling oil channels in the friction discs of the clutches 91, 92. The surface necessary for cooling is disposed radially about the outer clutch 91 according to one aspect of the present invention. The cooling oil that is heated up by the slippage occurring in the clutches directly contacts the surface of the annular cooler 106 after leaving the outer disc carrier 94.

Figure 15:
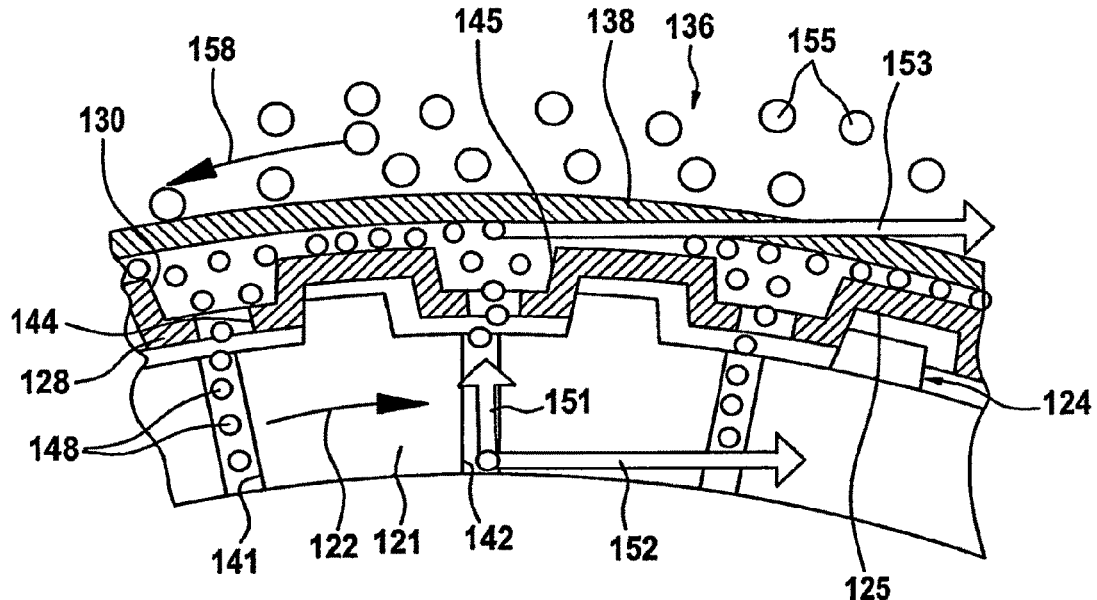
FIG. 15 is an enlarged, fragmentary view of a cooler of a torque transmitting device in accordance with an embodiment of the present invention.

In FIG. 15 a portion of a clutch disc facing 121 is shown in a side view. Arrow 122 indicates that the clutch disc facing rotates clockwise during operation. The clutch disc facing 121 has radially outwardly-extending external teeth 124 that engage with radially inwardly extending recesses 125 between teeth provided on a disc carrier 128. The disc carrier 128 includes radially outwardly-extending outer teeth 130. At a radial distance from the disc carrier 128, a cooler 136 with a cooler wall 138 is disposed. The cooler 136 is of annular form.

The clutch disc facing 121 includes cooling oil grooves 141, 142. The cooling grooves 141, 142 have openings near throughbores 144, 145 that are provided in the disc carrier 128. The medium to be cooled is indicated by small circles 148. Arrow 151 represents a radial velocity component of the medium to be cooled. Arrow 152 represents a circumferential velocity component of the medium to be cooled. In the cooler 136, a cooling medium, preferably water, is included, which is indicated by larger circles 155. Arrow 158 indicates that the cooling medium 155 flows through the annular cooler 136 in a counterclockwise direction.

Due to the rotation of the disc carrier 128 and of the clutch disc facing 121, the cooling oil, when leaving the clutch disc, has a an initial radial velocity component 151 produced by the centrifugal force, and also has an initial circumferential velocity component 152 produced by the circumferential pulling effect of the cooling oil grooves 141, 142. The outer teeth 130 of the outer disc carrier 128 act as a circumferential guide mechanism and thus maintains the final circumferential velocity component 153 of the oil almost constant. As a result of the circumferential pulling effect, the time of exposure of the hot oil at the surface of the cooler wall 138 is increased, which facilitates the discharge of an accordingly large amount of heat to the cooler 136.

Figure 16:
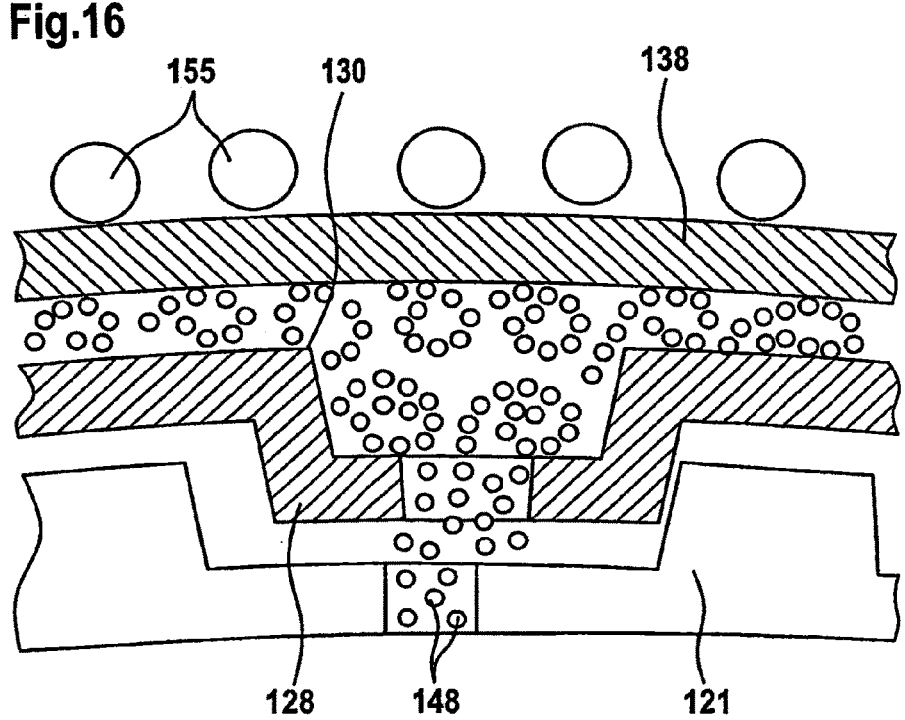
FIG. 16 is an enlarged detail of FIG. 15.

As shown in FIG. 16, by virtue of the rather large peripheral speed of the disc carrier 128, during the operation of the clutch, and by virtue of the relatively small distance between the cooler wall 138 and the outer teeth 130 of the disc carrier 128, an oil drag flow with a high level of turbulence is produced. The greater the turbulence of the flow, the better the heat transfer from the cooling oil to the cooler. Through the strong swirling of the oil molecules, which do not only move in the circumferential direction, but also transversely to the flow direction, the result is that each oil molecule reaches the surface of the cooler at least once and can discharge the stored heat.

Figure 17:
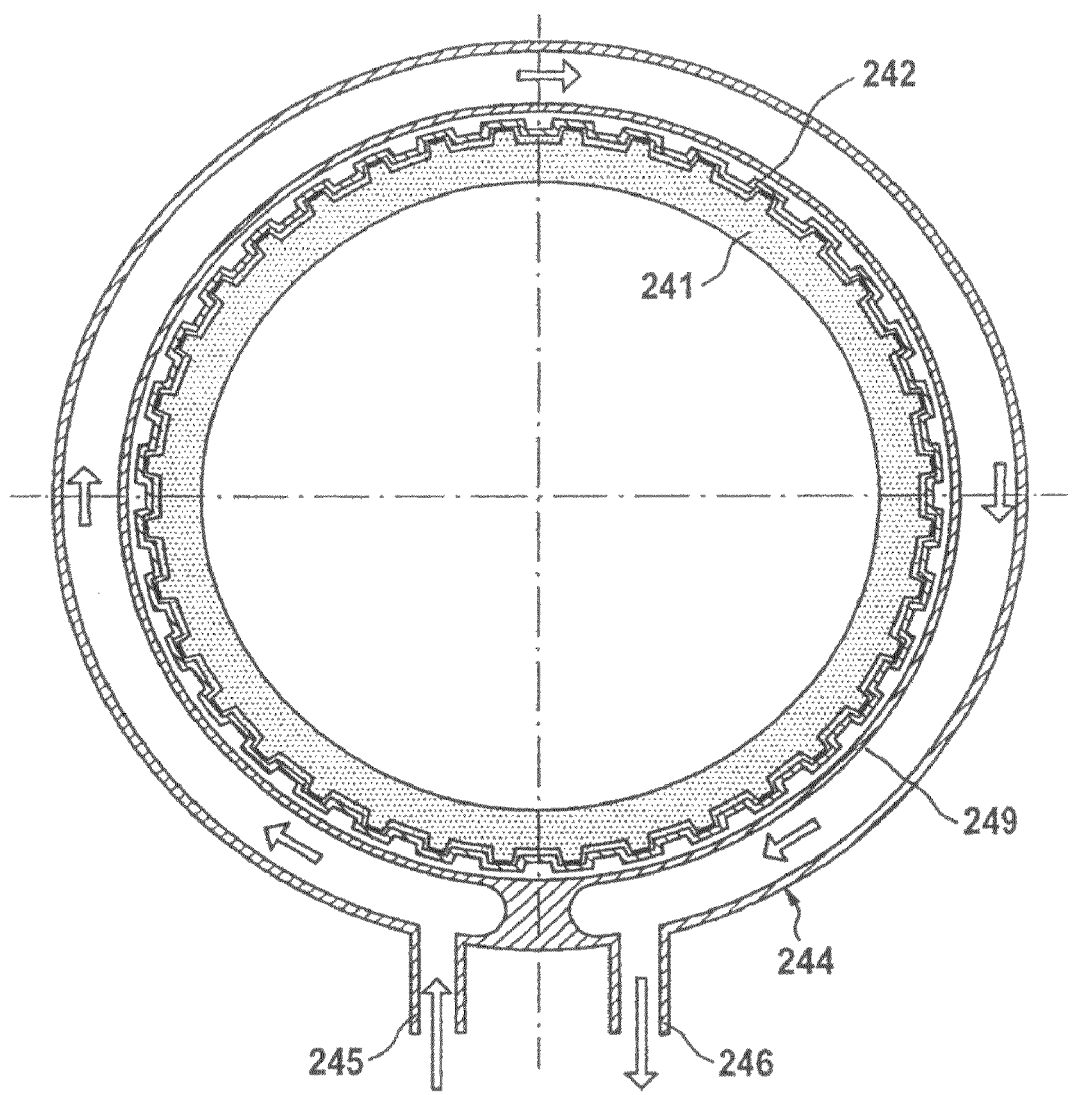
FIG. 17 is a cross-sectional view of a torque transmitting device with cooler in accordance with another embodiment of the present invention.

A steel disc 241 is shown in FIG. 17 and is engaged with an outer disc carrier 242. An oil cooler 244 is disposed radially outwardly of the outer disc carrier 242. The cooler 244 has an inlet 245 and an outlet 246 for the cooling medium. The arrows shown in FIG. 17 indicate the cooling medium flowing through the cooler 244.

The cooler 244 is annular and is disposed so that cooling oil leaving the outer disc carrier 242 directly impacts the surface of the cooler inner wall 249. The flow direction of the cooling medium is always against the direction of rotation of the engine and thus of the clutch. That causes small energy losses due to the low average temperature difference between the fluids. The principle of operation of the present invention is similar to the principle of operation of a counterflow heat exchanger. The difference, however, is that hot cooling oil from the clutch is provided to the cooler over the entire cooler circumference, which means the oil inflow temperature is almost constant. The cooling medium temperature in the cooler, however, increases from the cooler inlet 245 to the cooler outlet 246.

The distance between the outer teeth of the outer disc carrier 242 and the cooler inner wall 249 of the cooler 244 is determined by the diameter of the cooler. That distance is preferably selected so that the cooling power due to the high turbulence of the cooling oil, and thus a large heat-transfer coefficient, becomes as large as possible, and the drag moment due to the Newtonian shear stress of the cooling oil becomes as low as possible. The effect of the distance on the cooling power and on the heat-transfer coefficient is indirectly proportional, which means that when the distance is large, the drag moment is small and the cooling power is low. At a distance as small as possible, cooling power and drag moment are inversely affected.

In order to improve heat transfer, the heat transfer surface between the cooler inner wall 249 and the cooling medium can be enlarged. For that purpose, several possibilities can be considered.

Figure 18:
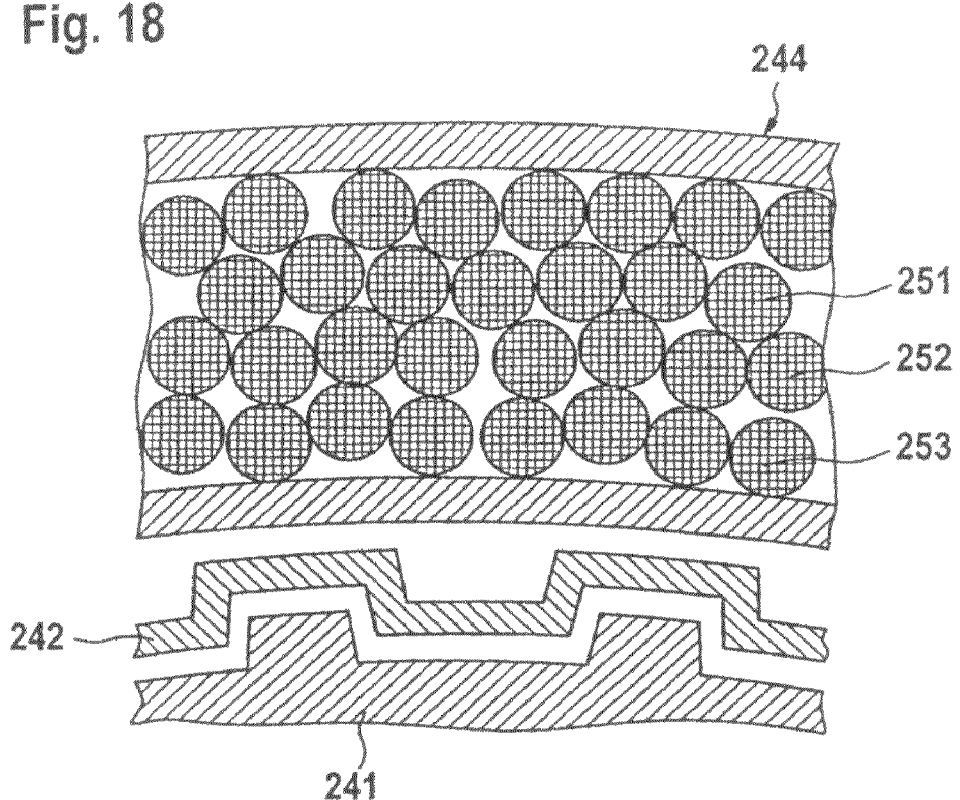
FIG. 18 is an enlarged detail of a portion of FIG. 17 in accordance with another embodiment of the present invention.

FIG. 18 shows that the cooler 244 can be filled with a plurality of balls 251-253 having an open porous metal foam structure. The balls 251-253 are preferably made of a material that corresponds to the material of the cooler housing. The cooler can also be filled with a material present in the form of loose material, e.g., with metal chips. The filling is preferably performed so that the material is in contact with the cooler wall, so that the contact surface between the cooler wall and the cooling medium is highly increased, while only slightly increasing the flow-through resistance of the cooler to the cooling medium.

Figure 19:
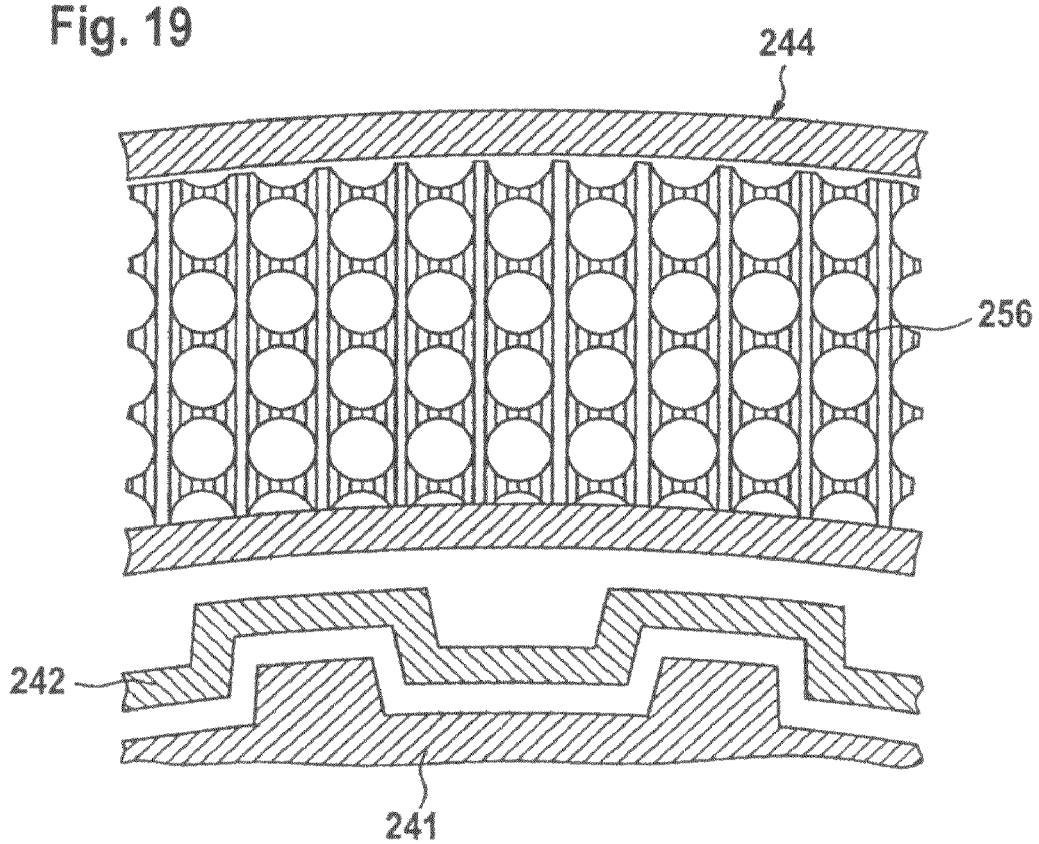
FIG. 19 is an enlarged detail of a portion of FIG. 17 in accordance with another embodiment of the present invention.

FIG. 19 shows that the cooler 244 can also include installed annular turbulence plates 256 for surface area increase, and which are beaded or perforated, or beaded and perforated. The plates 256 are preferably disposed so that they are in contact with the heat absorbing cooler inner wall, and can thus conduct the heat into the center of the cooler 244 in order to be able to transfer it to the cooling medium there. Through the perforation and/or corrugation of the plates 256, the flowing cooling medium is deflected with respect to its flow direction. The molecules of the cooling medium are thereby increasingly deflected with respect to the main flow direction, and thus facilitate a higher heat-transfer coefficient, and consequently a greater cooling power through an increased contact with the turbulence plates 256 and the cooler walls. Additionally, the cooling power is increased by the increased surface area.

Figure 20:
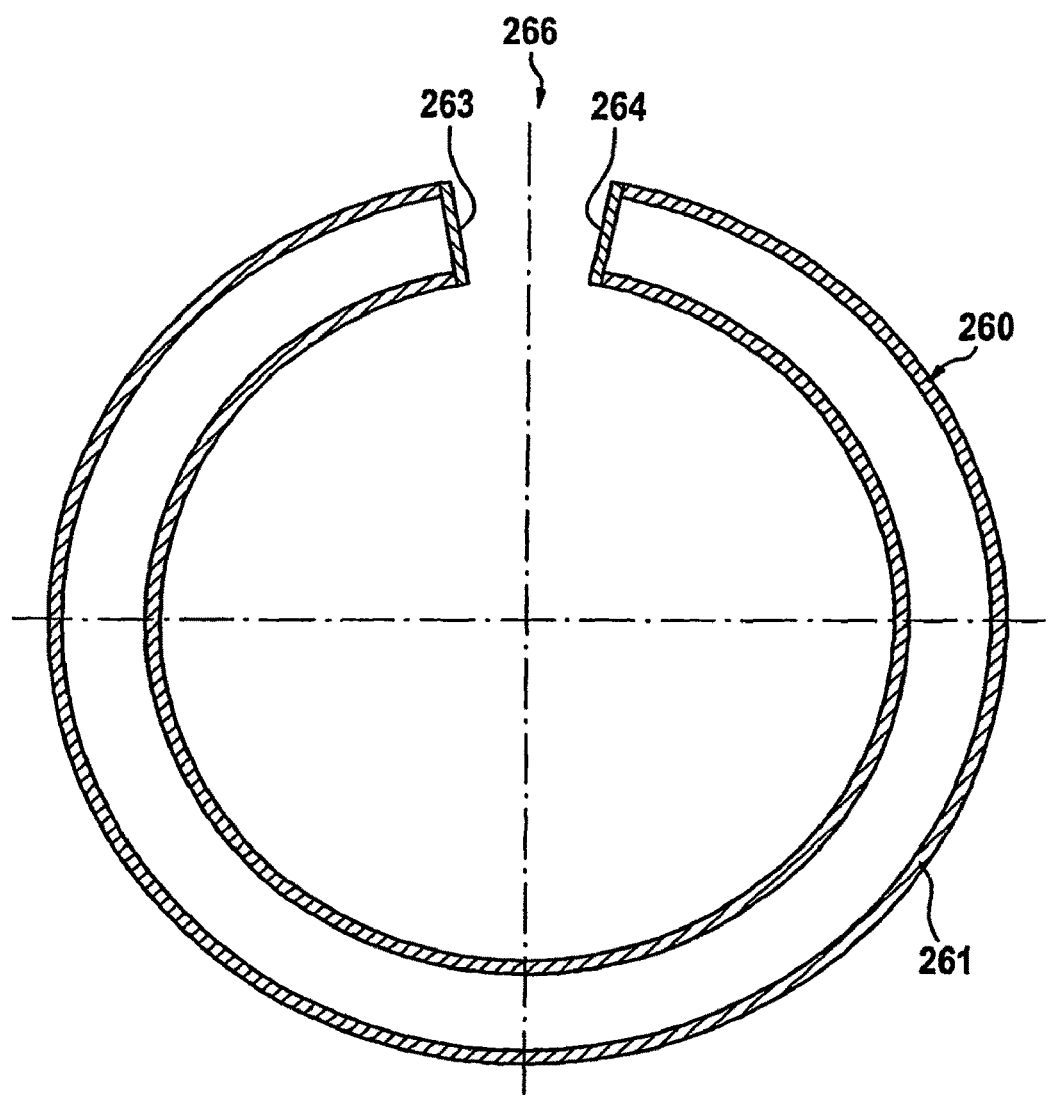
FIG. 20 shows a cross-sectional view of a cooler for a torque transmitting device in accordance with another embodiment of the present invention.

FIG. 20 shows a cross-sectional view of a cooler 260 in the form of a bent tube 261. The tube 261 is closed by a cover 263, 264, respectively, at each of its open ends, wherein the covers are welded to the tube 261. The cooler 260 thus has the shape of a ring provided with an opening 266. In order to avoid escape of the oil drag flow during operation, the opening 266 is closed by a bridge plate, which is not shown.

Figure 21:
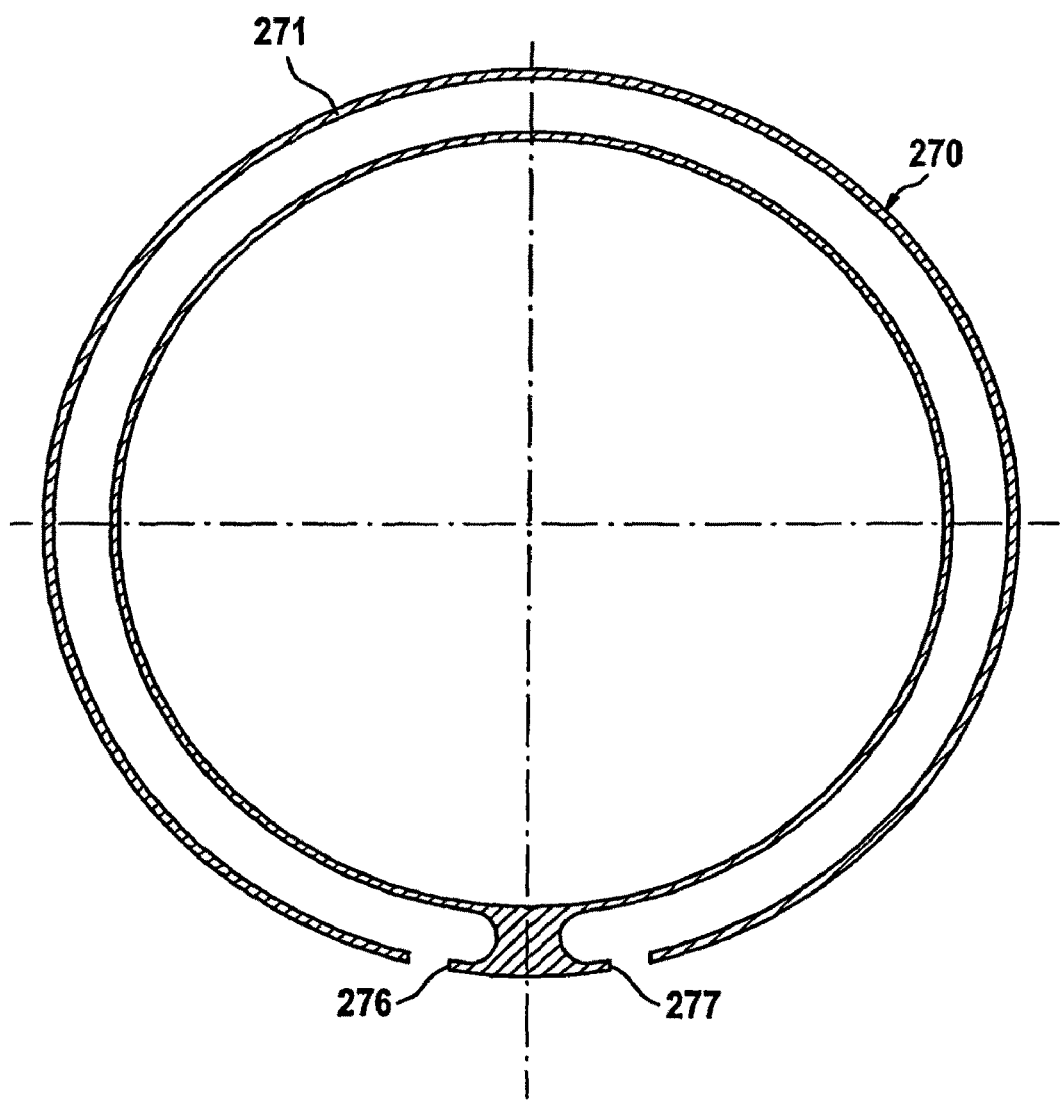
FIG. 21 shows a cross-sectional view of a cooler for a torque transmitting device in accordance with another embodiment of the present invention.

FIG. 21 shows a cross-sectional view of a cooler 270 that can be produced by milling from a solid ring 271. The cavity receiving the cooling medium is thus fabricated by milling. Subsequently, the cooler 270 is closed by a suitable cover. The cooler 270 includes an inlet 276 and an outlet 277 that open radially outwardly for the cooling medium.

Figure 22:
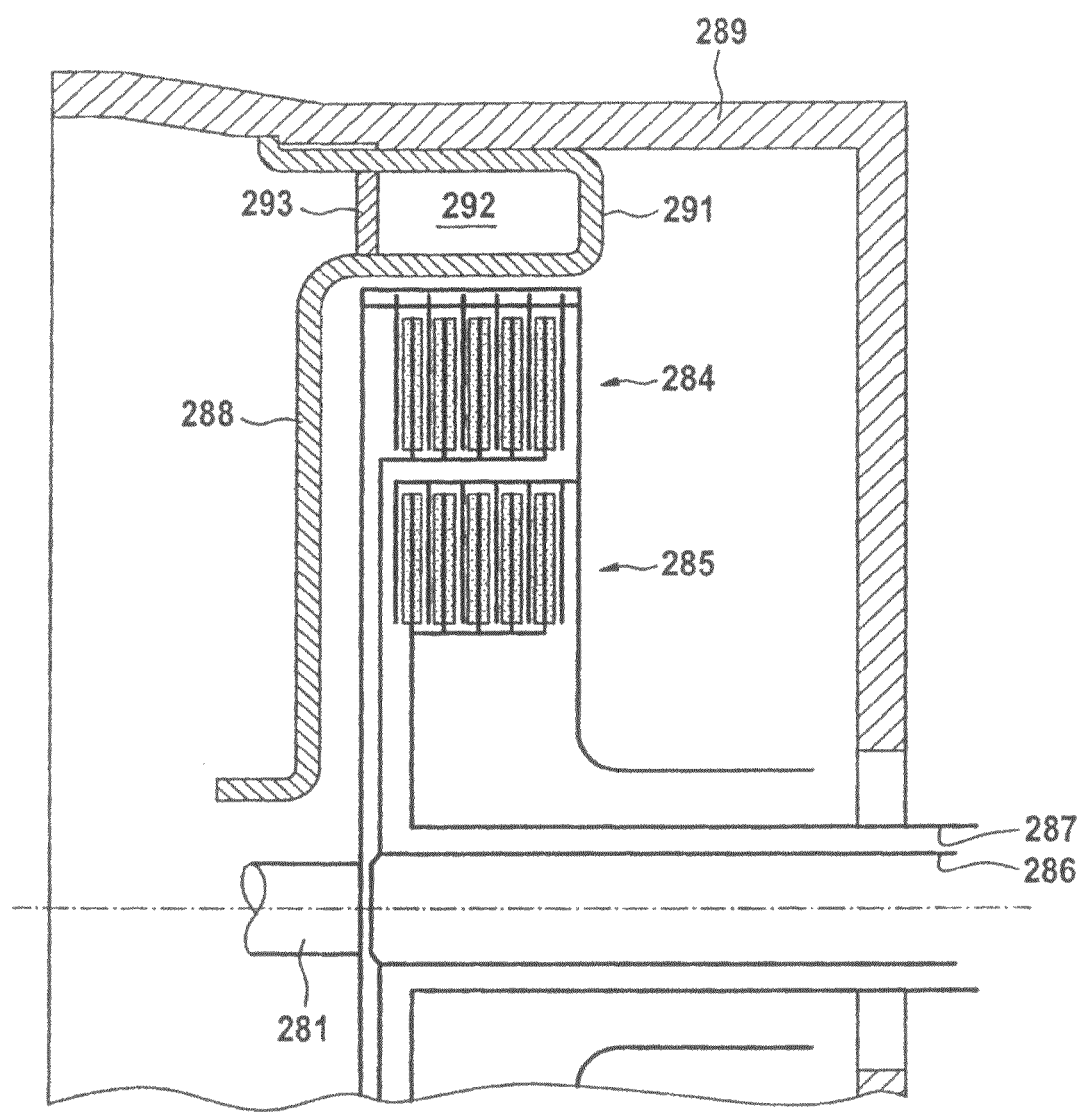
FIG. 22 is a simplified fragmentary cross-sectional view of a torque transmitting device in accordance with another embodiment of the present invention.

FIG. 22 shows a crankshaft 281 of an internal combustion engine that can be coupled to the transmission shafts 286, 287 through multidisc clutches 284, 285. A clutch cover 288 is supported at a transmission housing section 289, which is also designated as a clutch bell. The clutch cover 288 includes a U-shaped cross section 291 radially between the multidisc clutch 284 and the clutch bell 289. The U-shaped cross section 291 of the clutch cover 288 defines an annular cavity 292, which is closed on the drive side by a circular annular disc 293. The clutch cover 288 among other things is used for supporting the clutch engagement forces of the multidisc clutches 284, 285 through a bearing, which is not shown. By virtue of the U-shaped cross section 291, it is possible to integrate the cooler into the clutch cover 288.

Figure 23:
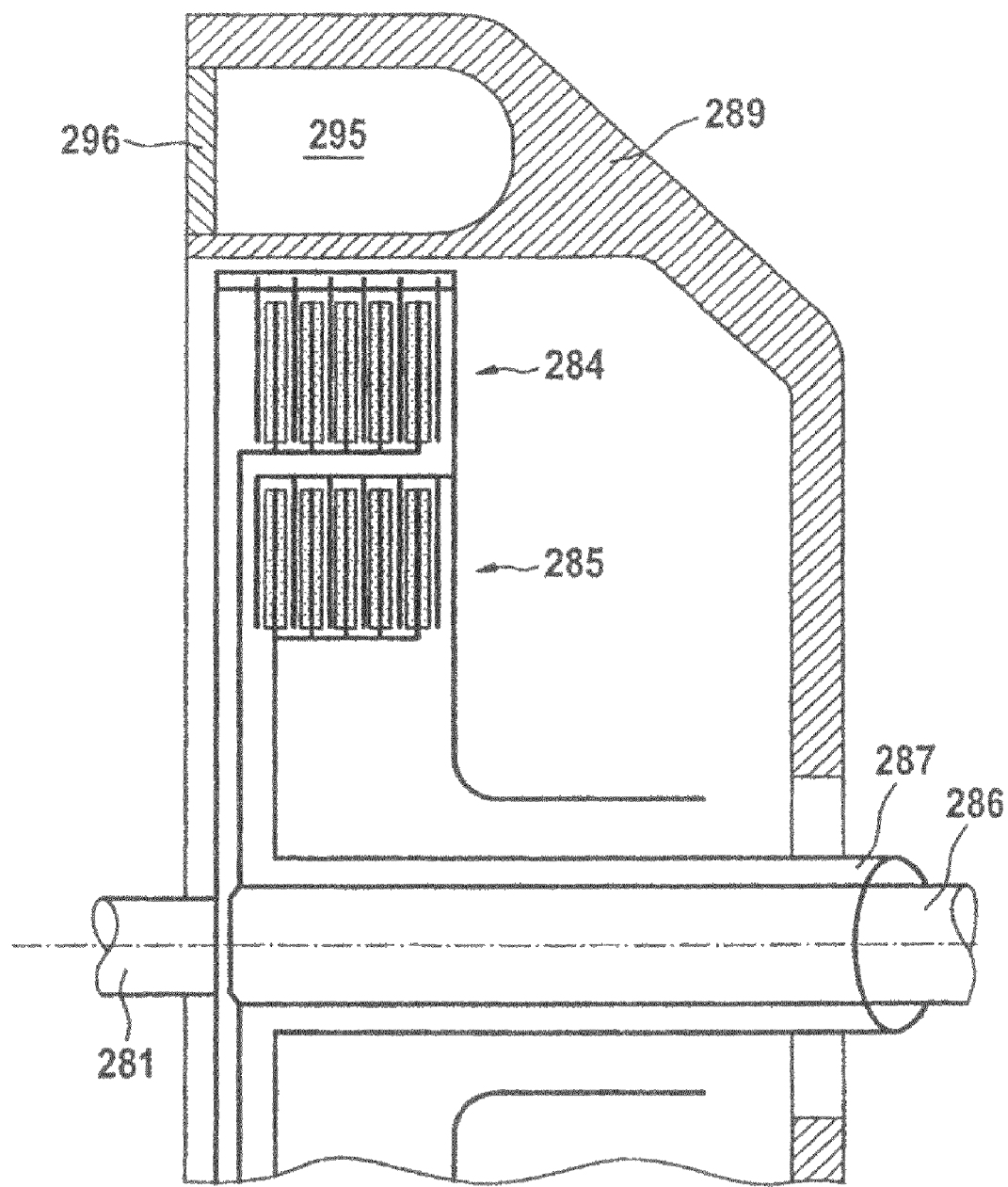
FIG. 23 is a simplified fragmentary cross-sectional view of a torque transmitting device in accordance with another embodiment of the present invention.

FIG. 23 shows that the clutch bell 289 can also be provided as a cast component. Then, it is advantageous to cast an annular cavity 295 into the clutch bell 289. The annular cavity 295 can be used as a cooler and can be closed by cover 296. When the cooler does not have to be filled with additional swirl plates, it is possible to integrally cast the closed cavity 295 with respective connections. The clutch bell 289 with the cavity 295 can be connected directly to the engine by a flange and a suitable seal.

Figure 24:
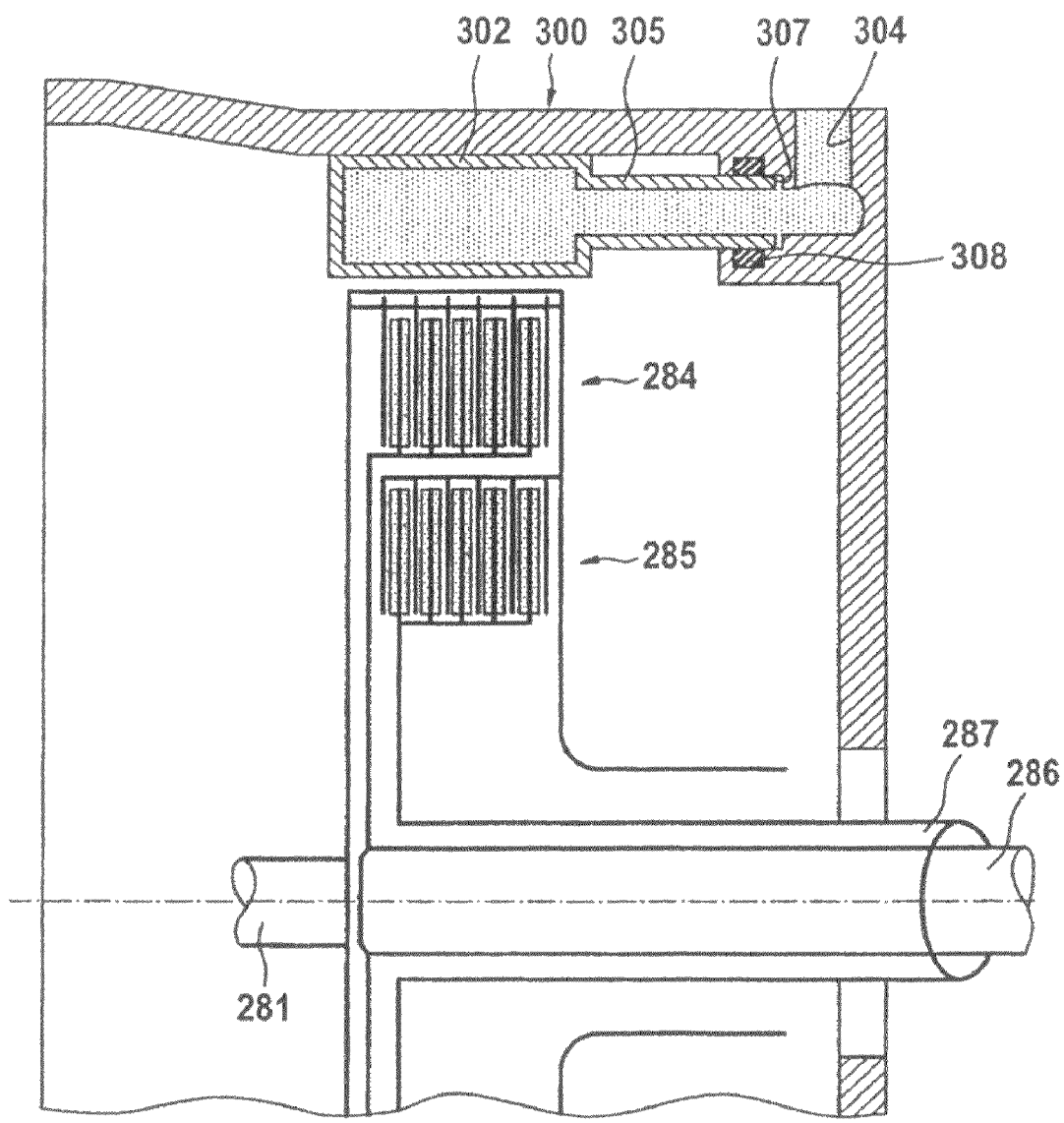
FIG. 24 is a simplified fragmentary cross-sectional view of a torque transmitting device in accordance with another embodiment of the present invention.

FIG. 24 shows a clutch bell 300 that is radially inwardly contacted by a cooler 302. The cooler 302 is disposed in the radial direction between the multidisc clutch 284 and the clutch bell 300. A radially extending water inflow bore 304 is provided in clutch bell 300. The water inflow bore 304 is connected to the inner cavity of the cooler 302 through a connection spout 305. The connection spout 305 extends parallel to the transmission input shafts 286, 287. The free end of the connection spout 305 is received in an axial bore 307 in the clutch bell 300 and is sealed by an O-ring 308. During installation, the cooler 302 is inserted from the drive side into the clutch bell 300. Thus, the connection spout 305 and an additional connection spout are inserted into respective bores in the clutch bell 300. In the region outside the clutch bell 300, connection conduits for the input and the output of cooling medium are mounted, which are not shown.

Figure 25:
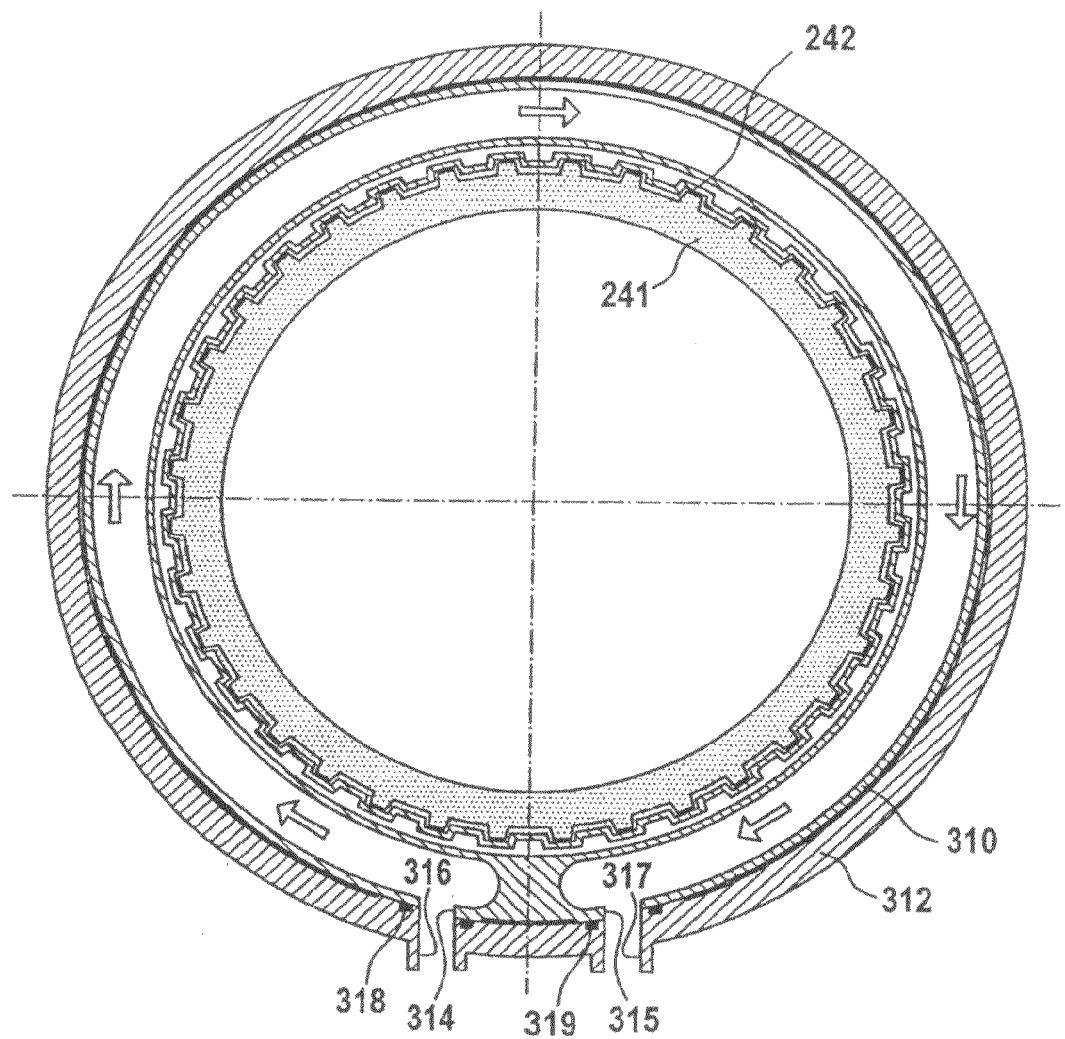
FIG. 25 is a cross-sectional view of a torque transmitting device in accordance with another embodiment of the present invention.

FIG. 25 shows a cross-sectional view of a cooler 310 that is disposed radially between a clutch bell 312 and an outer disc carrier 242 that includes a steel disc 241. The cooler 310 includes an inlet bore 314 and an outlet bore 315 for the cooling medium. The inlet bore 314 is aligned with an inlet bore 316 provided in the clutch bell 312. The outlet bore 315 of the cooler 310 is aligned with an outlet bore 317 provided in the clutch bell 312. The inlet bores 314, 316 and the outlet bores 315, 317 extend parallel to one another in a vertically downward direction. The cooler connections are sealed respectively by an O-ring 318, 319 with respect to the clutch bell 312. Connection conduits, which are not shown, are then connected to the inlet and outlet bores 316, 317, respectively, of the clutch bell 312.

The disclosed embodiments do not constitute any restrictions of the invention. To the contrary, numerous variations and modifications are possible within the scope of the present disclosure, in particular those that can be formed by combination or variation of particular features, or elements, or method steps, in conjunction with those included in the general description, and in the description of the figures, and in the claims, and in the drawings.

What is claimed is:

1. A clutch unit for use in a drive train of a motor vehicle between a drive unit and a transmission having at least one transmission input shaft, said clutch unit comprising: at least one wet running, rotatable clutch device that includes a plurality of clutch discs that are positioned within a surrounding clutch housing and are at least partially wetted by and cooled by a coolant liquid that is cooled by a cooler after the coolant liquid leaves the clutch discs, wherein the cooler is an annular enclosure that is radially outward of and that surrounds the clutch device and has at least one inner wall that is radially outward of and opposite the clutch device and against which cooler inner wall coolant liquid from the clutch device comes into contact under the effect of centrifugal force when the clutch device rotates, and wherein a liquid cooling medium is delivered to the annular enclosure and flows within the annular enclosure in a rotational direction that is opposite to the direction of rotation of the clutch device.

2. A clutch unit according to claim 1, wherein movement of heated coolant liquid from the clutch device to the cooler is achieved by kinetic energy supplied to the coolant liquid.

3. A clutch unit according to claim 1, wherein the cooler is integrated into the clutch housing that surrounds the clutch device.

4. A clutch unit according to claim 1, wherein a rotatable component of the clutch device includes outwardly extending coolant liquid conveying regions that produce a rotating ring of coolant liquid within the clutch housing.

5. A clutch unit according to claim 4, wherein the coolant liquid conveying regions are carried on an outer disc carrier of the clutch device.

6. A clutch unit according to claim 4, wherein the coolant liquid conveying regions are provided adjacent to an inner wall of the housing.

7. A clutch unit according to claim 4, wherein the coolant liquid conveying regions are positioned axially adjacent to the coolant liquid cooler.

8. A clutch unit according to claim 4, wherein the coolant liquid conveying regions produce a circumferential circulation of coolant liquid within the clutch housing.

9. A clutch unit according to claim 8, wherein the clutch housing includes a coolant liquid outlet in a region where the circumferential circulation of coolant liquid exits, and wherein the coolant liquid outlet receives coolant liquid that emanates tangentially from a radially inner surface of the cooler and is tangentially fixed relative to the inner surface of the cooler, and wherein the coolant liquid outlet is connected to a jet pump from which coolant liquid is returned to the clutch device.

10. A clutch unit according to claim 9, wherein the jet pump is connected to a coolant liquid storage tank.

11. A clutch unit according to claim 9, wherein the coolant liquid outlet from the clutch housing is positioned adjacent a vertically lowermost part of the clutch housing.

* * * * *